(12) United States Patent
Christian et al.

(10) Patent No.: US 7,816,442 B2
(45) Date of Patent: *Oct. 19, 2010

(54) SURFACE-MODIFIED PRECIPITATED SILICAS

(75) Inventors: Hans-Dieter Christian, Alzenau (DE); Juergen Schubert, Gelnhausen (DE); Uwe Schmeier, Hasselroth (DE)

(73) Assignee: Evonik Degussa GmbH, Essen (DE)

( * ) Notice: Subject to any disclaimer, the term of this patent is extended or adjusted under 35 U.S.C. 154(b) by 342 days.

This patent is subject to a terminal disclaimer.

(21) Appl. No.: 11/939,335

(22) Filed: Nov. 13, 2007

(65) Prior Publication Data

US 2008/0139756 A1 Jun. 12, 2008

Related U.S. Application Data

(62) Division of application No. 10/844,343, filed on May 13, 2004, now Pat. No. 7,553,889.

(30) Foreign Application Priority Data

May 14, 2003 (DE) .................................. 103 21 575
Mar. 12, 2004 (DE) ........................ 10 2004 012 090

(51) Int. Cl.
*C08K 3/34* (2006.01)

(52) U.S. Cl. ........................ 524/492; 523/212; 523/216; 524/493

(58) Field of Classification Search ................. 523/212, 523/216; 524/492, 493

See application file for complete search history.

(56) References Cited

U.S. PATENT DOCUMENTS 6,899,951 B2   5/2005   Panz et al.

FOREIGN PATENT DOCUMENTS

| DE | 36 27 782 | 2/1988 |
|----|-----------|--------|
| DE | 38 15 670 | 1/1990 |
| DE | 198 16 362 | 10/1999 |
| EP | 1 281 733 | 2/2003 |

*Primary Examiner*—Edward J Cain
(74) *Attorney, Agent, or Firm*—Oblon, Spivak, McClelland, Maier & Neustadt, L.L.P.

(57) ABSTRACT

A surface-modified precipitated silica, useful as a matting agent, contains the silica having a polymer on a surface thereof. The surface-modified precipitated silica improves the transmission of a clear coating material, having a refractive index of $n_D 20 = 1.4492$ and containing 5% by weight of said silica, by at least 20%, in comparison to the same clear coating material containing 5% by weight of a reference precipitated silica surface treated with a polyethylene wax.

21 Claims, 1 Drawing Sheet

*FIG. 1*
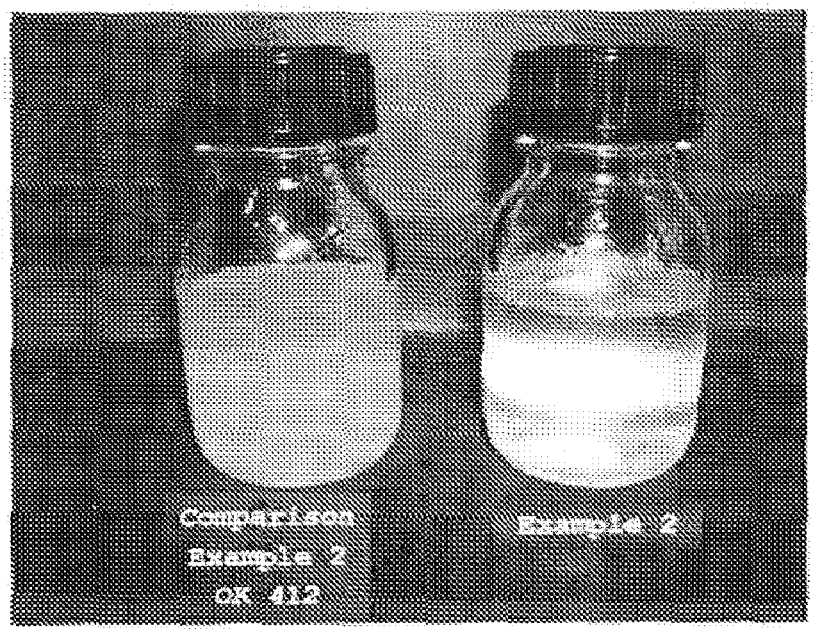
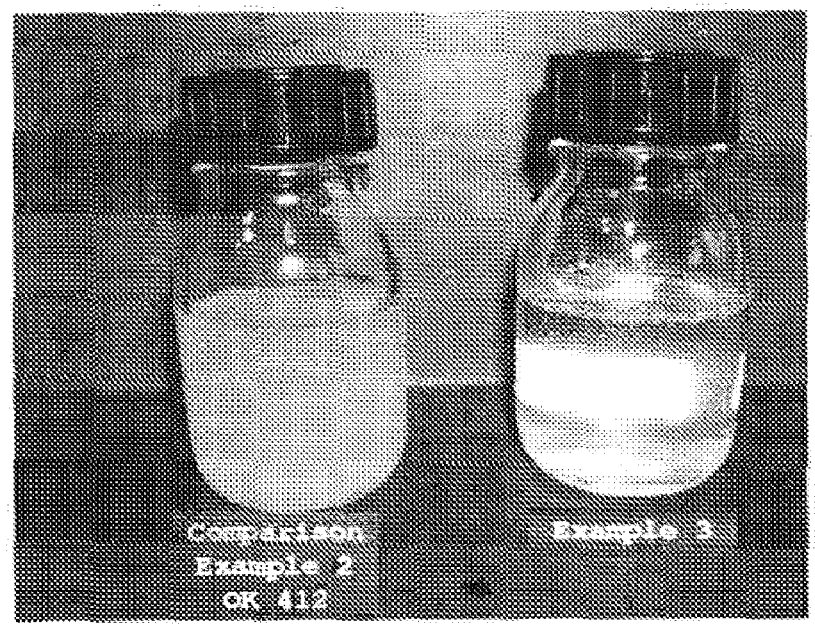
*FIG. 2*

SURFACE-MODIFIED PRECIPITATED SILICAS

BACKGROUND OF THE INVENTION

1. Field of the Invention

The present invention relates to a precipitated silica surface-modified by treatment with a polymer, and to a process for its preparation.

2. Description of the Related Art

The surface modification of precipitated silicas has long been known and serves for producing functional-enhancement materials for silicone rubbers, ink-jet applications or coating materials (as matting agents).

Thus EP 0 922 671 describes the preparation of a hydrophobic precipitated silica where a polyethylene wax emulsion is added to a conventional, dried precipitated silica which is subsequently ground in a classifier mill or opposed-jet fluid-bed mill.

DE 25 13 608 describes a process for hydrophobicizing finely divided silicas by treating the dry silica with organosilanes in a fluidized state at temperatures from 200 to 300° C.

To simplify the hydrophobicization process EP 0 341 383 proposes introducing silicone oil emulsions into a suspension of precipitated silicas.

A similar process is described by DE 24 35 860, in which a suspension of precipitated silica is reacted with optionally precondensed organohalosilanes. After the solid has been isolated by filtration it is heated at temperatures from 300 to 400° C. and subsequently ground.

Precipitated silicas are frequently used for the matting of coating surfaces. A coating film thus matted ought to exhibit minimal gloss at a variety of viewing angles. Since hydrophilic precipitated silicas may tend toward severe sedimentation in coating materials and therefore are difficult if not impossible to reagitate, it is common to use wax-coated precipitated silicas as matting agents. The wax-coating of the silica surface substantially improves the sedimentation behavior. If the matting agent sediments at all, such sedimentation is so minimal that it can be reagitated without expending much energy.

Where clear coating materials are used it is desirable that the transparency of the coating material not be influenced by the incorporation of the matting agent.

SUMMARY OF THE INVENTION

It is an object of the present invention to provide surface-modified silicas which when used as matting agents in clear coating materials lead to improved properties of the coating materials.

It is another object to provide a process for preparing the surface-modified silicas.

This and other objects have been achieved by the present invention the first embodiment of which includes a surface-modified precipitated silica, comprising:

said silica having a polymer on a surface thereof;

wherein said surface-modified precipitated silica improves a transmission of a clear coating material, having a refractive index of $n_D20=1.4492$ and containing 5% by weight of said silica, by at least 20%, in comparison to said clear coating material containing 5% by weight of a reference precipitated silica surface treated with a polyethylene wax.

In another embodiment, the present invention relates to a process for preparing a surface-modified precipitated silica, comprising:

a) precipitating an alkali metal silicate solution with an acidifier under weak acidic to alkaline conditions,
b) further adding an acidifier to set a pH of from 7 to 2, to give a silica suspension,
c) isolating a precipitated silica by filtration from the silica suspension, and
d) drying the precipitated silica such that a residual moisture content of said silica is less than 10%,
e) treating the silica suspension or the precipitated silica with a polymer to obtain said surface-modified precipitated silica, the amount and the nature of the polymer being chosen such that the surface-modified precipitated silica improves a transmission of a clear coating material, having a refractive index of $n_D20=1.4492$ and containing 5% by weight of said silica, by at least 20%, in comparison to said clear coating material containing 5% by weight of a reference precipitated silica surface treated with a polyethylene wax.

In yet another embodiment, the present invention relates to a matting agent, comprising:

the surface-modified precipitated silica according to claim 11.

BRIEF DESCRIPTION OF DRAWINGS

FIG. 1 shows a comparison between Comparative Example 2 and Example 2 of the present invention.

FIG. 2 shows a comparison between Comparative Example 2 and Example 3 of the present invention.

DETAILED DESCRIPTION OF THE INVENTION

Surprisingly it has been found that the silicas of the present invention improve the transparency of coating materials and possess sedimentation properties at least as good as those of silicas coated with polyethylene wax (PE wax). They therefore possess advantages over wax-coated matting agents, which frequently cause clouding of the clear coating material.

It has been found that precipitated silicas can be modified by coating with particular polymers such that coating materials having a refractive index in the range from 1.4000 to 1.5000 and into which the precipitated silicas of the present invention have been incorporated exhibit outstanding transparency. The refractive index of the coating material includes all values and subvalues therebetween, especially including 1.4005, 1.4010, 1.4050, 1.4100, 1.4200, 1.4300, 1.4400, 1.4500, 1.4600, 1.4700, 1.4800, and 1.4900.

In comparison to coating materials which comprise conventional, PE-wax-coated silica matting agents and have a refractive index in the range from 1.4000 to 1.5000, identical coating materials comprising the silicas of the present invention as matting agents exhibit a greatly improved transparency, even in liquid form, and the sedimentation properties too are outstanding. Clear coating materials matted with conventional matting agents are generally cloudy in liquid form, whereas the clear coating materials matted with the precipitated silicas of the present invention are clear and transparent even in liquid form.

The present invention accordingly provides precipitated silicas whose surface has been modified with a polymer such that the modified precipitated silicas improve by at least 20% the transmission of a coating material having a refractive index of $n_D20=1.4492$ containing 5% by weight of these modified precipitated silicas in comparison to an identical coating material containing 5% of a reference precipitated silica treated with a polyethylene wax.

The present invention further provides a process for preparing such surface-modified precipitated silicas by a) precipitating an alkali metal silicate solution with an acidifier under weakly acidic to alkaline conditions,
b) further adding an acidifier to set a pH of from 7 to 2, to give a silica suspension,
c) isolating the precipitated solid by filtration, and
d) drying the solid using slow drying, e.g., rotary tube dryers or plate dryers, or by rapid drying, e.g., spray dryers, spin flash dryers, such that the product has a residual moisture content of less than 10%, which comprises in step
e) treating the precipitated silica with a polymer, the amount and the nature of the polymer being chosen such that, the modified precipitated silica improves by at least 20% the transmission of a clear coating material having a refractive index of $n_D20=1.4492$ containing 5% by weight of this modified precipitated silica in comparison to an identical coating material containing 5% by weight of a reference precipitated silica treated with a polyethylene wax.

The surface-modified silicas of the present invention are precipitated silicas which have been coated with a polymer and which as a result improve by at least 20% the transmission of a clear coating material having a refractive index of $n_D20=1.4492$ containing 5% by weight of this modified precipitated silica in comparison to an identical coating material containing 5% by weight of a reference precipitated silica treated with a polyethylene wax. The transmission is improved preferably by at least 25%, in particular 30%. The reference silica treated with polyethylene wax is preferably ACEMATT OK 412, a commercial product from Degussa, having a specification in accordance with the product information leaflet of 12/02, which is expressly incorporated herein by reference in its entirety. As reference precipitated silicas it is also possible to use precipitated silicas which feature the same untreated silica and are coated with a polyethylene wax.

In accordance with the product information leaflet 12/02, ACEMATT® OK 412 has the following properties:

| Features and test methods | Units | ACEMATT ® OK 412 |
|---|---|---|
| Loss on drying<br>2 h at 105° C.<br>in acc. with DIN EN ISO 787-2 | % | 6 |
| Loss on ignition[1)]<br>2 h at 1000° C.<br>in acc. with DIN EN ISQ 3262-1 | % | 13 |
| pH<br>5% in water<br>in acc. with DIN EN ISO 787-0 | — | 6 |
| Sulfate content as SO$_4$<br>IR spectroscopy<br>Degussa method | % | 1 |
| Particle size<br>mean value (TEM) | μm | 3 |
| D50 value (laser diffraction) | | 6.0 |
| Surface treatment | | Organic |
| Tapped density<br>unsieved<br>in acc. with DIN EN ISO 787-11 | g/l | 130 |
| Density<br>in acc. with DIN EN ISO 787-10 | g/cm$^3$ | 1.9 |
| Oil number<br>in acc. with DIN EN ISO 787-5 | g/100 g | 220 |
| SiO$_2$ content[2)]<br>in acc. with DIN EN ISO 3262-19 | % | 98 |

[1)]based on dried substance
[2)]based on ignited substance

The silicas of the present invention are further characterized by the following properties:

Particle distribution d50: 1-50 μm, with the preferential ranges 1-40 μm, 1-30 μm, 2-20 μm Oil absorption DBP: 100-600 g/100 g, with the preferential ranges 150-500 g/100 g, 200-450 g/100 g, and 250-400 g/100 g C content: 1-20%, with the preferential ranges 1-10% and 2-8%

Sears number $V_2$: <25 ml/5 g

As surface-modifying polymers it is possible to use polyorganosiloxanes or modified polyorganosiloxanes. The modified polyorganosiloxanes are, in particular, polyether-modified and acrylate- and/or polyacrylate-modified polyorganosiloxanes. Polyalkoxysiloxanes can also be used.

One preferred embodiment of the present invention uses polyorganosiloxanes having the following general structure:

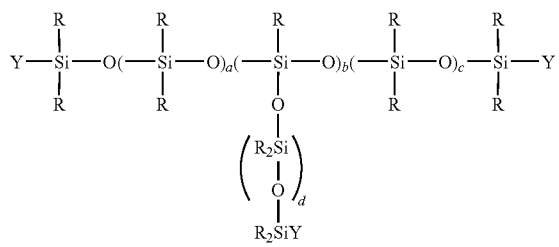

where
Y=—OH, —OR or
Y=H$_5$C$_2$—O—(C$_2$H$_4$O)$_m$—, H$_7$C$_3$—O—(C$_3$H$_6$O)$_m$— or

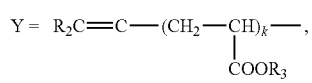

R=alkyl, in particular methyl or ethyl,
R$_2$=alkyl,
R$_3$=alkyl,
a=0-100, b=0-100, c=0-100, d=0-100,
m=0-100 and k=0-100.

Another preferred embodiment of the present invention uses polyorganosiloxane having the following general structure:

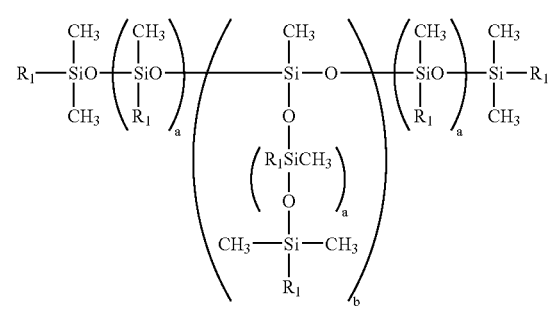

where
$R_1$ is a methyl radical or

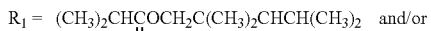

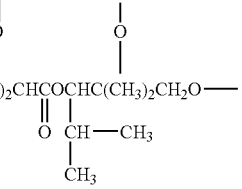

and the sum of the units a=0 to 100, the sum of the units b=0 to 15, the ratio of methyl to alkoxy radicals for the radicals $R_1$ being less than 50:1 and b being $\geq 1$ if a=0, and a$\geq$5 if b=0. Further details, in particular in relation to the preparation of these polysiloxanes, can be found in DE 36 27 782 A1. The content of that patent application is incorporated herein by reference in its entirety.

By alkyl radical are meant straight-chain or branched-chain alkyl radicals having 1 to 100 carbon atoms, preferably 1 to 25, more preferably 1 to 10 carbon atoms, and also cycloalkyl radicals having 1 to 15 carbon atoms. The alkyl radicals may contain one or more double or triple bonds, and individual atoms can be replaced by heteroatoms such as O, N or S.

In steps a) and b) of the process of the present invention the aqueous alkali metal silicate solution used is preferably sodium silicate (waterglass) having a density of about 1.343 kg/l with a weight fraction of 27.3% $SiO_2$ and 7.9% $Na_2O$. The acidifier used can be any mineral acid, especially concentrated sulfuric acid (96% $H_2SO_4$), or $CO_2$.

In step a)
the components, as described for example in DE 31 44 299, are combined with one another with stirring. The content of DE 31 44 299 is incorporated herein by reference in its entirety. Optionally one or more acidifier(s) can be added simultaneously with waterglass to an initial charge of water or sodium silicate. Step a) proceeds at a temperature of from 50 to 90° C., preferably 50-65° C. The temperature includes all values and subvalues therebetween, especially including 55, 60, 65, 70, 75, 80, and 85° C. It should be ensured that the precipitation is carried out while maintaining a weakly acidic to alkaline pH. The pH is preferably 6-12. The pH includes all values and subvalues therebetween, especially including 6.5, 7, 7.5, 8, 8.5, 9, 9.5, 10, 10.5, 11, and 11.5. Optionally precipitation can be carried out at constant pH or constant alkali number.

In step b)
an acidifier is added, preferably the acidifier already used for the precipitation, in order to set a pH in the acidic or neutral range (pH 7 to 2). The pH includes all values and subvalues therebetween, especially including 2.5, 3, 3.5, 4, 4.5, 5, 5.5, 6 and 6.5.

In step c)
the silica present in the suspension, optionally after a waiting time of from 0 to 90 minutes, preferably from 15 to 60 minutes, is isolated by filtration and washed to neutrality with deionized water.

In step d)
the solid is dried by rapid drying, e.g., spray dryers, spin flash dryers, or slow drying, e.g., rotary tube dryers or plate dryers, such that the product has a residual moisture content of less than 10% by weight. The moisture content of the product includes all values and subvalues between 0 and 10%, especially including 0.5, 1, 1.5, 2, 2.5, 3, 3.5, 4, 4.5, 5, 5.5, 6, 6.5, 7, 7.5, 8, 8.5, 9 and 9.5% by weight.

The surface modification (step e)) can be carried out at different points in time.

In a preferred embodiment 1)
of the process of the present invention, in step e), 0.5-30% by weight of the surface-modifying polymer is introduced into the silica suspension adjusted in step b) to a pH of 7-2. The addition takes place preferably with a duration between 1 and 30 minutes, in particular from 5 to 15 minutes, and is preferably carried out at the reaction temperature of the precipitation in step a), i.e., in particular at from 50 to 90° C., preferably 50-65° C. The amount of surface modifying polymer includes all values and subvalues therebetween, especially including 1, 2, 4, 6, 8, 10, 12, 14, 16, 18, 20, 22, 24, 26 and 28% by weight. The duration of the addition includes all values and subvalues therebetween, especially including 2, 4, 6, 8, 10, 12, 14, 16, 18, 20, 22, 24, 26 and 28 min. The temperature includes all values and subvalues therebetween, especially including 55, 60, 65, 70, 75, 80, and 85° C. Subsequently the surface-modified silica, as described for steps c) and d), is isolated by filtration and dried.

In preferred embodiment 2)
of the present invention the silica precipitated in accordance with steps a) and b) is isolated by filtration as described for step c), optionally washed with deionized water, then resuspended with water or sulfuric acid or with a mixture of water and sulfuric acid and then in step, e) 0.5-30% by weight of the surface-modifying polymer is introduced into the suspension and the resulting suspension is sprayed in a spray dryer, so that the surface modification takes place during the drying operation. The amount of surface modifying polymer includes all values and subvalues therebetween, especially including 1, 2, 4, 6, 8, 10, 12, 14, 16, 18, 20, 22, 24, 26 and 28% by weight. In addition, it is also possible to conceive of the simultaneous introduction through nozzles of silica suspension and siloxane. Spray drying takes place at 200-500° C. such that the product has a residual moisture content of less than 10%. The drying temperature includes all values and subvalues therebetween, especially including 250, 300, 350, 400, and 450° C. The moisture content of the product includes all values and subvalues between 0 and 10%, especially including 0.5, 1, 1.5, 2, 2.5, 3, 3.5, 4, 4.5, 5, 5.5, 6, 6.5, 7, 7.5, 8, 8.5, 9 and 9.5% by weight. The solids content of the silica suspension to be sprayed can be up to 25% by weight. The solids content of the silica suspension includes all values and subvalues between 0 and 25%, especially including 1, 2, 4, 6, 8, 10, 12, 14, 16, 18, 20, 22, and 24% by weight.

In a preferred embodiment 3)
of the process of the present invention the silica is prepared and dried as described in steps a)-d). Subsequently, in step e), the dried precipitated silica is admixed with 0.5-30% by weight of the surface-modifying polymer and the two are intimately mixed. The amount of surface modifying polymer includes all values and subvalues therebetween, especially including 1, 2, 4, 6, 8, 10, 12, 14, 16, 18, 20, 22, 24, 26 and 28% by weight. The polymer is added over from 0 to 120 min, preferably over from 0 to 60 min, more preferably over from 0 to 30 min. The mixture is mixed further at 20-150° C. for 0-2 h. Mixing takes place preferably at 20-100° C., more preferably at 20-80° C. The mixing operation is carried out for preferably 0-1 h and more preferably 0-30 min. The time for addition of the polymer includes all values and subvalues therebetween, especially including 10, 20, 30, 40, 50, 60, 70, 80, 90, 100 and 110 min. The mixing temperature includes all values and subvalues therebetween, especially including 30, 40, 50, 60, 70, 80, 90, 100, 110, 120, 130, and 140° C. The mixing time includes all values and subvalues therebetween, especially including 10, 20, 30, 40, 50, 60, 70, 80, 90, 100 and 110 min.

In the preparation process of the present invention the polymers are preferably added such that during the reaction of the polymer with the silica the ratio of polymer to silica is from 0.5 g:1.00 g to 30 g:100 g, in particular from 2 g:100 g to 20 g:100 g, especially from 3 g:100 g to 13 g:100 g.

Preferred surface-modifying polymers for the process of the present invention are polyorganosiloxanes or modified polyorganosiloxanes. The modified polyorganosiloxanes are, in particular, polyether-modified and acrylate- and/or polyacrylate-modified polyorganosiloxanes. Polyalkoxysiloxanes can also be used.

One preferred embodiment of the present invention, uses polyorganosiloxanes having the following general structure:

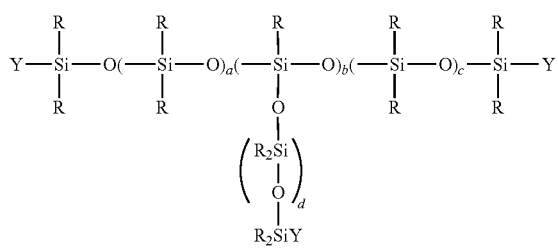

where
Y=—OH, —OR or
Y=$H_5C_2$—O—$(C_2H_4O)_m$—, $H_7C_3$—O—$(C_3H_6O)_m$— or

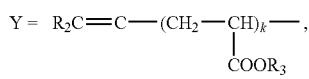

R=alkyl, in particular methyl or ethyl,
$R_2$=alkyl,
$R_3$=alkyl,
a=0-100, b=0-100, c=0-100, d=0-100,
m=0-100 k=0-100.

Another preferred embodiment of the present invention uses polyorganosiloxane having the following general structure:

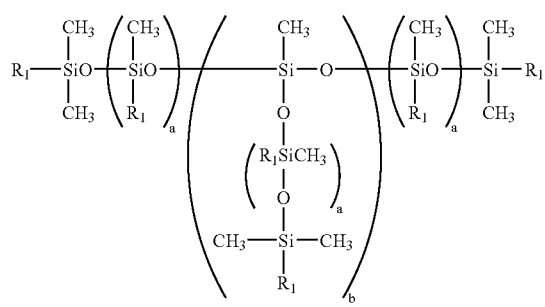

where
$R_1$ is a methyl radical or

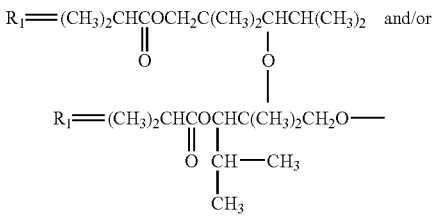

and the sum of the units a=0 to 100, the sum of the units b=0 to 15, the ratio of methyl to alkoxy radicals for the radicals $R_1$ being less than 50:1 and b being $\geq$1 if a=0, and a$\geq$5 if b=0. Further details, in particular in relation to the preparation of these polysiloxanes, can be found in DE 36 27 782 A1. The content of DE 3 627 782 A1 is incorporated herein by reference in its entirety.

Optionally, in the case of embodiment 1) and 2) it is also possible to add an emulsifying auxiliary such as LA-S 687 (TEGO GmbH), for example. This is particularly appropriate in the case of organosilicon compounds which are not water-soluble.

In order to achieve the desired particle distribution it is necessary for the surface-modified silicas, after they have been dried, to be ground and simultaneously classified in step f). This grinding can be carried out in commercially customary crossflow mills (e.g., from Alpine or Netzsch-Condux).

In order to avoid oversize or bits it is advantageous, after the surface-modified precipitated silicas have been dried or after or during their grinding in step f), to separate off particles with a diameter above 50 μm, preferably above 30 μm, in particular above 20 μm. Depending on the fineness of the matting agent this can be done by means, for example, of a corresponding sieve or classifier means, which may also be integrated in the mill.

The properties of the precipitated silicas of the present invention were determined by the following methods:

Determination of the Transmission of Coating Materials

The transmission measurement took place using a UV/Vis spectrophotometer Specord 200 from Analytik Jena GmbH in 1 cm quartz cells at room temperature against air as reference. The slot width and step length was 2 nm.

For this purpose an acid-curing (AC) varnish having a refractive index $n_D20$=1.4492 and the following general composition:
  30.2% by weight xylene
  15.1% by weight ethoxypropanol
  15.1% by weight ethanol
  39.6% by weight Plastopal BT, 60% strength (urea-formaldehyde resin which contains urethane groups and is etherified with short-chain alcohols, from BASF AG, Ludwigshafen),
was introduced as the initial charge and the 2.5 g of the respective matting agent (surface-modified silica) were incorporated. The matting agent was dispersed in 50 g of AC varnish with a paddle stirrer at 2000 revolutions/minute for 10 minutes at room temperature. Dispersing took place in a 180 ml PE mixing beaker at room temperature. The paddle diameters of the stirrer are 43 mm. Subsequently the freshly prepared dispersion was placed in 1 cm quartz cells and UV/Vis spectra were recorded in transmission between 190 and 1100 nm.

Determination of the Modified Sears Number of Silicas

By titrating silicas with potassium hydroxide solution in the range from pH 6 to pH 9 it is possible to determine the modified Sears number (called Sears number $V_2$ below) as a measure of the number of free hydroxyl groups.

The determination method is based on the following chemical reactions, where "Si—OH" is intended to symbolize a silanol group:

"Si"—OH+NaCl 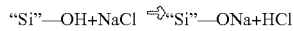 "Si"—ONa+HCl

HCl+KOH 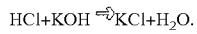 KCl+$H_2O$.

Procedure 10.00 g of a silica in powder, bead or granule form with a moisture content of 5±1% are ground for 60 seconds in an IKA universal mill M 20 (550 W; 20 000 rpm). It may be necessary to adjust the moisture content by drying at 105° C. in a drying cabinet or by uniform moistening. 2.50 g of the silica thus treated are weighed out at room temperature into a 250 ml titration vessel and 60.0 ml of methanol p.a. are added. When the sample has been wetted completely, 40.0 ml of deionized water are added and the mixture is dispersed using an Ultra Turrax T 25 (stirrer shaft KV-18 G, 18 mm diameter) for 30 seconds at a rotary speed of 18 000 rpm. The particles of sample adhering to the edge of the vessel and the stirrer are rinsed into the suspension using 100 ml of deionized water and the suspension is conditioned to 25° C. in a thermostated water bath.

The pH meter (from Knick, model: 766 pH meter Calimatic with temperature sensor) and the pH electrode (combined electrode from Schott, type N7680) are calibrated at room temperature using buffer solutions (pH 7.00 and 9.00). The pH meter is used first to measure the initial pH of the suspension at 25° C., and then depending on the result the pH is adjusted to 6.0 using potassium hydroxide solution (0.1 mol/l) or hydrochloric acid solution (0.1 mol/l). The consumption of KOH or HCl solution in ml to reach pH 6.00 corresponds to $V_1'$.

Thereafter 20.0 ml of sodium chloride solution (250.00 g of NaCl p.a. made up to 1 l with deionized water) are metered in. Using 0.1 mol/l KOH, the titration is then continued to a pH of 9.00. The consumption of KOH solution in ml to reach pH 9.00 corresponds to $V_2'$.

Subsequently the volumes $V_1'$ and $V_2'$ are first standardized to the theoretical sample weight of 1 g and expanded by a factor of 5, giving $V_1$ and the Sears number $V_2$ in the units ml/5 g. The measurements are in each case carried out in duplicate.

DBP Absorption

The DBP absorption (DBP number), which is a measure of the absorbency of the precipitated silica, is determined as follows in accordance with the standard DIN 53601:

Procedure 12.50 g of silica in powder or bead form with a moisture content of 0-10% (the moisture content is adjusted where appropriate by drying at 105° C. in a drying cabinet) are introduced into the kneader chamber (article number 279 061) of the Brabender Absorptometer "E". In the case of granules the sieve fraction from 3.15 to 1 mm (stainless steel sieves from Retsch) is used (by gentle pressing of the granules through the 3.15-mm-pore-size sieve using a plastics spatula). With continual mixing (peripheral speed of the blades of the kneader: 125 rpm) dibutyl phthalate is added dropwise to the mixture at a rate of 4 ml/min at room temperature, by means of the Brabender T 90/50 Dosimat. Its incorporation by mixing requires only a small amount of force, and is monitored by means of the digital display. Toward the end of the determination the mixture becomes pasty, as indicated by a sharp increase in the required force. At a display reading of 600 digits (torque of 0.6 Nm) an electrical contact shuts off both the kneader and the DBP feed. The synchronous motor for the DBP feed is coupled to a digital counter, so that the consumption of DBP in ml can be read off.

Evaluation

The DBP absorption is reported in g/100 g and is calculated using the following formula from the DBP consumption measured. The density of DBP at 20° C. is typically 1.047 g/ml.

DBP absorption in g/100 g=consumption of DBP in ml*density of DBP in g/ml* 100/12.5 g The DBP absorption is defined for the anhydrous, dried silica. When moist precipitated silicas are used the figure must be corrected by means of the correction table below.

The correction value corresponding to the water content is added to the experimental DBP value; for example, a water content of 5.8% would mean an addition of 33 g/100 g for the DBP absorption.

| Correction table for dibutyl phthalate absorption - anhydrous - | | | | | |
|---|---|---|---|---|---|
| | .% water | | | | |
| % Water | .0 | .2 | .4 | .6 | .8 |
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of the Moisture Content of Silicas

According to this method and working on the lines of ISO 787-2 the volatile fractions (called "moisture content" for simplicity below) of silica are determined after 2 hours drying at 105° C. This loss on drying generally consists predominantly of water moisture.

Procedure 10 g of the silica in powder, bead or granule form is weighed out to an accuracy of 0.1 mg (sample weight E) into a dry glass weighing boat with ground-glass lid (diameter 8 cm, height 3 cm). With the lid open, the sample is dried in a drying cabinet at 105±2° C. for 2 h. Thereafter the weighing boat is sealed and cooled to room temperature in a desiccator cabinet with silica gel as siccative. The final weight A is determined gravimetrically.

The moisture content in % is determined as (E in g−A in g)*100%/E in g.

The measurement is carried out in duplicate.

Determination of the Loss on Ignition:

2 h at 1000° C. after drying, DIN 55 921/3.4, ISO 3262

Determination of the d50

Aggregate size distribution by laser diffraction (Coulter)

Apparatus:
Laser diffraction instrument LS 230, Coulter
Bandelin ultrasound rod, type HID 2200, with DH 13 G horn
Cooling bath 80 ml Eppendorf pipette 5 ml
Centrifuge glass, height 7 cm, Ø 3 cm
Petri dish, height 4 cm, Ø 7 cm
Dewar vessel, height 21 cm, Ø 4 cm
Digital thermometer, accuracy t 0.1 K Reagents:
Ethanol, p.a., Merck
Triton x-100, Merck
Sodium hexametaphosphate, Baker Sample Preparation:

Granules are placed in a mortar and the coarse granule pieces are crushed, not mortared.

1 g of unaged silica (produced not more than 10 days earlier) is weighed out into a 30 ml glass vessel with a rolled edge, and 20 ml of dispersion solution (20 g of sodium hexametaphosphate made up to 1000 ml with demineralized water) are added. The sample is subsequently placed in a cooling bath, which. prevents the suspension heating up significantly, and is treated with ultrasound for 1 min (20 W power, 80% pulses).

Three dispersion solution specimens are prepared in succession for each silica.

Until the sample is introduced into the liquid module, the suspension is placed in a Petri dish with magnetic stirrer in order to prevent any sedimentation.

Procedure:

Prior to the beginning of the measurement the instrument and the liquid module are warmed up for at least 30 minutes and the module is rinsed automatically for 10 minutes (menu bar "Control/Rinse").

In the control bar of the Coulter software the file window "calculate Opt. Model" is selected via the menu item "Measurements" and the refractive indices are defined (liquid refractive index real=1.332; material refractive index real=1.46, imaginary=0.1).

In the file window "Measurement cycle" the level of the pump speed is set at 26% and the ultrasound power at 3%. The ultrasound items to be activated are "during sample addition", "before each measurement", and "during measurement".

Additionally in this file window the following items are selected:
Offset measurement (1×daily)
Adjustment
Background measurement
Set measurement concentration
Enter sample info
Enter measuring info
Start 2 measurements
Automatic rinsing
With PIDS data When calibration is over the samples are added. Dispersed silica is added until light absorption of about 45% is reached and the instrument reports OK.

The measurement is made with the Fraunhofer model, using the standard software of the laser diffraction instrument LS 230 from Coulter.

Three duplicate determinations of 60 seconds are carried out on each sample added.

From the raw data plot the software calculates the particle size distribution on the basis of the volume distribution.

Determination of the C content

Apparatus:
C-mat 500 from Strohlein instruments
Analytical balance
Porcelain boat with lid
Tweezers
Metering spoon Reagents:
Euro analysis control sample 077-2 (Ströhlein Instruments)
Oxygen Procedure Measurement of the Control Sample Measurement is carried out first on the control sample. For this purpose 0.14-0.18 g of sample is weighed out onto a fully baked and cooled porcelain boat on an analytical balance. When the start key is actuated the weight is carried over, since the balance is coupled with the C-mat. The boat must be pushed into the middle of the combustion tube within 30 seconds. When combustion is over the figure measured is converted into pulses and evaluated by the computer. Two or more determinations are carried out. If necessary the factor of the instrument must be set anew. The factor is calculated in accordance with the following formula:

$$\text{factor} = \frac{\text{target value} * \text{sample weight} * 100}{\text{pulses}}$$

Measurement of the Silica Samples

After the factor has been determined, the silica samples are measured. For this purpose 0.04-0.05 g of each silica is weighed out into a porcelain boat and the boat is covered with a porcelain lid. Subsequently the silica samples are subjected to measurement in the same way as for the control sample. In the case of deviations >0.005% a third measurement and, if necessary, further measurements is/are carried out and the average is calculated.

Evaluation

The carbon content is calculated in accordance with the following formula:

$$\%C = \frac{P * F * 10^{-5}}{E * 1000}$$

where:
P=pulses
F=factor
E=initial weight in g

Reporting of Result

The result is given in % C to 2 decimal places.

Remarks

The C-mat 500 can be handled in accordance with the operating instructions from Ströhlein Instruments.

Having generally described this invention, a further understanding can be obtained by reference to certain specific examples which are provided herein for purposes of illustration only, and are not intended to be limiting unless otherwise specified.

EXAMPLES

Examples 1-3

The silica was prepared by the method of DE 1767332:

A heatable 120 l precipitating vessel with stirrer unit was charged with 80 l of water and the alkali number was adjusted to 20 with 5.5 l of waterglass (density=1.346 g/l, $SiO_2$ content=27.3%, $Na_2O$ content=7.9%). This initial charge was heated to 85° C. The entire precipitation was carried out at this temperature. Thereafter, in parallel, waterglass, with a metering rate of 207 ml/min, and sulfuric acid (50%), with a metering rate of 45 ml/min, were metered in, in such a way that there is no change in the alkali number. After 30 minutes a shearing unit was connected up, and shears the precipitation suspension during subsequent precipitation with such intensity that at the end of precipitation a particle distribution of $d50=7$ μm was attained. After 45 minutes the metering of waterglass and sulfuric acid is interrupted for 30 minutes. Then waterglass and sulfuric acid are resumed and are metered in at the same rate as above. After a further 45 minutes the metering of waterglass is shut off and sulfuric acid is metered in until a pH of 3.5 is reached. Precipitation is then at an end.

Subsequently the amount of polyorganosiloxane emulsion (TEGO Foamex 1435, TEGO GmbH) listed in the table below is added all at once to the silica suspension and stirring is continued at elevated temperature for a period of 30 minutes. Thereafter the silica thus coated is isolated by filtration, washed, dried, ground, and classified by the method of DE 17 67 332.

Table 1 shows a comparison of three surface-modified silicas prepared by the above methods with an untreated silica ACEMATT HK 400 (publicly freely available commercial product from Degussa). Examples 1-3 are silicas treated with different amounts of polyorganosiloxane.

Example 4

Comparison of the matting agents of the present invention with a prior art matting agent, by transmission measurements on coating materials. For this purpose three coating mixtures were prepared, with incorporation of 2.5 g of each matting agent into 50 g of an acid-curing (AC) varnish (refractive index $n_D 20=1.4492$) of the following general composition:

30.2% by weight xylene
15.1% by weight ethoxypropanol
15.1% by weight ethanol
39.6% by weight Plastopal BT, 60%, strength (urea-formaldehyde resin which contains urethane groups and is etherified with short-chain alcohols, from BASF AG, Ludwigshafen).

Sample Preparation:

For the measurement, 2.5 g of matting agent were dispersed in 50 g of AC varnish at room temperature using a paddle stirrer at 2000 revolutions/minute for 10 minutes. Dispersing takes place in a 180 ml PE mixing beaker at room temperature. The paddle diameters of the stirrer are 43 mm.

Measurement:

UV/Vis spectra of the freshly prepared dispersions are recorded in transmission between 190, and 1100 nm. The measurements are made on a Specord 200 W/Vis spectrophotometer from Analytik Jena GmbH in 1 cm quartz cells at room temperature against air as reference. The slot width and step length is 2 mm.

In accordance with the instructions above, the transmission values of coating materials comprising a matting agent according to example 2 or 3 or a PE-wax-coated matting agent ACEMATT OK 412 were measured. ACEMATT OK 412 is a publicly freely available commercial product of Degussa AG, corresponding to the product information leaflet 12/02. Additionally the transmission values of the plain varnish without matting agent were measured.

The transmission values obtained were as follows:

| Sample designation | Transmission in % at 600 nm | Transmission in % at 700 nm | C content in % |
|---|---|---|---|
| Unmatted AC varnish | 92.9 | 93.0 | n.d. |
| Comparative example 2, | 35.1 | 39.5 | 5.2 |

|  | Units | Comparative example 1 | Example 1 | Example 2 | Example 3 |
|---|---|---|---|---|---|
| Silica |  | ACEMATT HK 400 |  |  |  |
| Manufacturer and supplier |  | DEGUSSA AG | DEGUSSA AG | DEGUSSA AG | DEGUSSA AG |
| Amount of silica suspension | l | — | 60 | 60 | 60 |
| Solids content | g/l | — | 80 | 80 | 80 |
| Siloxane |  | — | Aqueous emulsion containing 20% ethoxypolysiloxane | Aqueous emulsion containing 20% ethoxypolysiloxane | Aqueous emulsion containing 20% ethoxypolysiloxane |
| Amount of siloxane emulsion added | kg |  | 1.25 | 2.50 | 5.00 |
| Stirring temp. | ° C. | — | 60 | 60 | 60 |
| Stirring time | Min | — | 30 | 30 | 30 |
| $d_{50}$ | Mm | 7.55 | 6.63 | 7.45 | 8.55 |
| DBP | g/100 g | 273 | 288 | 278 | 254 |
| C content | % | 0 | 2.1 | 6.3 | 11.1 |
| Sears number | ml/5 g | n.d. | 21.1 | 14 | 10.6 |
| Loss on drying | % | 4.5 | 4.1 | 3.5 | 2.8 |
| Loss on ignition | % | 4.9 | 5.5 | 10.2 | 17.7 |

-continued

| Sample designation | Transmission in % at 600 nm | Transmission in % at 700 nm | C content in % |
|---|---|---|---|
| ACEMATT OK 412 |  |  |  |
| Example 2 | 76.8 | 77.5 | 6.3 |
| Example 3 | 85.8 | 86.5 | 11.1 |

As is evident from the table above the transmission values of coating materials comprising the matting agents of the present invention from example 2 or 3 are very close to those of the plain, unmatted varnish. Accordingly these coating materials are very clear and transparent.

A coating material which comprises the common, widespread matting agent ACEMATT OK 412 shows transmission which is poorer by at least 35%, this being manifested in severe clouding of the coating material.

FIGS. 1 and 2 below show acid-curing (AC) varnishes comprising a matting agent according to Example 2 or 3, in each case in comparison with an identical AC varnish comprising ACEMATT OK 412. It is very clear that coating materials comprising the matting agents of the present invention are substantially clearer.

German patent application 10321575.1 filed May 14, 2003, and German patent application 102004012090.0 filed Mar. 12, 2004, are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A lacquer, comprising:
    a surface-modified precipitated silica having a polymer on a surface thereof;
    wherein the polymer used to surface modify the said surface-modified silica is a polyorganosiloxane or a modified polyorganosiloxane;
    wherein the polymer is a polyorganosiloxane having the following structure:

$$Y-\underset{R}{\overset{R}{Si}}-O(-\underset{R}{\overset{R}{Si}}-O)_a(-\underset{O}{\overset{R}{Si}}-O)_b(-\underset{R}{\overset{R}{Si}}-O)_c-\underset{R}{\overset{R}{Si}}-Y$$

$$\left(\begin{array}{c}R_2Si\\|\\O\\|\\R_2SiY\end{array}\right)_d$$

wherein
Y=—OH, —OR or
Y=$H_5C_2$—O—$(C_2H_4O)_m$—, $H_7C_3$—O—$(C_3H_6O)_m$— or $$Y=R_2C=C-(CH_2-\underset{COOR_3}{\overset{}{CH}})_k-,$$

R=alkyl,
$R_2$=alkyl,
$R_3$=alkyl,
a=0-100, b is >/=1 to 100=0-100, c=0-100, d is >/=1 to 100=0-100,
m=0-100 and k=0-100; or
wherein the polymer is a polyorganosiloxane having the following structure:

$$R_1-\underset{CH_3}{\overset{CH_3}{SiO}}-\left(\underset{R_1}{\overset{CH_3}{SiO}}-\right)_a \Bigg/ \left(\underset{O}{\overset{CH_3}{Si}}-O\right) \left(\underset{R_1}{\overset{CH_3}{SiO}}-\right)_a \underset{CH_3}{\overset{CH_3}{Si}}-R_1$$

$$\left(\begin{array}{c}(R_1SiCH_3)\\|\\O\\|\\CH_3-Si-CH_3\\|\\R_1\end{array}\right)_b$$

wherein
$R_1$ is a methyl radical or $$R_1 = (CH_3)_2CHC\underset{O}{\overset{\|}{O}}CH_2C(CH_3)_2CHCH(CH_3)_2 \text{ and/or}$$

$$R_1 = (CH_3)_2CHC\underset{O}{\overset{\|}{O}}CHC(CH_3)_2CH_2O-\underset{CH_3}{\overset{|}{CH}}-CH_3$$

and a sum of the units a=0 to 100, the sum of the units b=0 to 15, the ratio of methyl to alkoxy radicals for the radicals $R_1$ being less than 50:1 and b being ≧1 if a=0, and a≧5 if b=0.

2. The lacquer of claim 1, wherein the surface-modified silica satisfies the following requirement:
    a particle distribution d50 is 1-50 µm,
    an oil absorption DBP is 100-600 g/100 g, and
    a C content is 1-20%.

3. The lacquer of claim 1, wherein the surface-modified silica has a Sears number $V_2$<25 ml/5 g.

4. The lacquer of claim 3, wherein the surface-modified silica has a particle distribution d50 of from 1 to 40 µm.

5. The lacquer of claim 3, wherein the surface-modified silica has an oil absorption DBP of from 200 to 500 g/100 g.

6. The lacquer of claim 3, wherein the surface-modified silica has a C content of from 1 to 10%.

7. The lacquer of claim 1, wherein a uncoated silica of said surface-modified silica and said surface modified-silica are the same; and wherein said reference silica is coated with a polyethylene wax.

8. A process for preparing a lacquer according to claim 1, comprising:
    obtaining a surface-modified, hydrophobicized precipitated silica by
    a) precipitating an alkali metal silicate solution with an acidifier under weak acidic to alkaline conditions,
    b) further adding an acidifier to set a pH of from 7 to 2, to give a silica suspension,
    c) isolating the precipitated solid by filtration, thereby obtaining a precipitated silica, and
    d) drying the precipitated silica such that a residual moisture content is less than 10%,
    e) treating the silica suspension or the precipitated silica with a polymer to obtain said surface-modified precipitated silica, the amount and the nature of the polymer being chosen such that the modified precipitated silica improves a transmission of a clear coating material, having a refractive index of $n_D 20=1.4492$ and containing 5% by weight of this modified precipitated silica, by at least 20%, in comparison to said clear coating material containing 5% by weight of a reference precipitated silica treated with a polyethylene wax, and adding said surface-modified, hydrophobicized precipitated silica to a lacquer formulation.

9. The process as claimed in claim 8, wherein 0.5-30% by weight of a polyorganosiloxane or a modified polyorganosiloxane is added to the silica suspension adjusted in step b) to a pH of 7-2.

10. The process of claim 8, wherein the treatment in step e) is carried out for 1 to 30 minutes and with stirring.

11. The process of claim 8, wherein step e) is carried out in a silica suspension; and wherein the temperature of the silica suspension in step e) is 20-100° C.

12. The process as claimed in claim 8, wherein the precipitated silica isolated by filtration in accordance with step c) and optionally washed with deionized water is resuspended with water or sulfuric acid or with a mixture of water and sulfuric acid; and subsequently in step e) 0.5-30% by weight of a polyorganosiloxane or a modified polyorganosiloxane is added to the silica suspension and the resulting suspension is dried, to obtain said surface-modified silica.

13. The process of claim 11, wherein the drying after step e) takes place such that the product has a residual moisture content of less than 10%.

14. The process of claim 11, wherein the temperature of the silica suspension in step e) is 20-100° C.

15. The process as claimed in claim 8, wherein after step d) 0.5-30% by weight of polyorganosiloxane or a modified polyorganosiloxane is added in step e) to the silica and the two are intimately mixed.

16. The process of claim 15, wherein the addition in step e) is carried out with a duration of from 0 to 120 minutes and with mixing.

17. The process of claim 16, wherein the silica and the polyorganosiloxane or the modified polyorganosiloxane are mixed for 0-2 h more.

18. The process of one of claims 15, wherein the temperature of the mixture in step e) is 20-150° C.

19. The process of one of claim 8, further comprising f) grinding after the surface-modified precipitated silica has been dried.

20. The process of claim 19, wherein after the surface-modified silica has been dried or after or during the grinding in step f) particles having a diameter of more than 50 μm are separated off.

21. The lacquer of claim 1, wherein the surface-modified silica imparts improved transmission in relation to a reference precipitated silica treated with polyethylene wax, said reference precipitated silica having the following properties:

| Features and test methods | Units | ACEMATT ® OK 412 |
|---|---|---|
| Loss on drying 2 h at 105° C. in accordance with DIN EN ISO 787-2 | % | 6 |
| Loss on ignition based on dried substance 2 h at 1000° C. in accordance with DIN EN ISQ 3262-1 | % | 13 |
| pH 5% in water in accordance with DIN EN ISO 787-0 | — | 6 |
| Sulfate content as $SO_4$ IR spectroscopy Degussa method | % | 1 |
| Particle size | μm | |
| mean value (TEM) | | 3 |
| D50 value (laser diffraction) | | 6.0 |
| Surface treatment | | Organic |
| Tapped density unsieved in accordance with DIN EN ISO 787-11 | g/l | 130 |
| Density in accordance with DIN EN ISO 787-10 | g/cm³ | 1.9 |
| Oil number in accordance with DIN EN ISO 787-5 | g/100 g | 220 |
| $SiO_2$ content based on ignited substance in accordance with DIN EN ISO 3262-19. | % | 98 |

* * * * *